July 19, 1960 T. P. HIGNETT ET AL 2,945,754
GRANULAR FERTILIZER FROM CALCIUM METAPHOSPHATE
Filed April 19, 1956
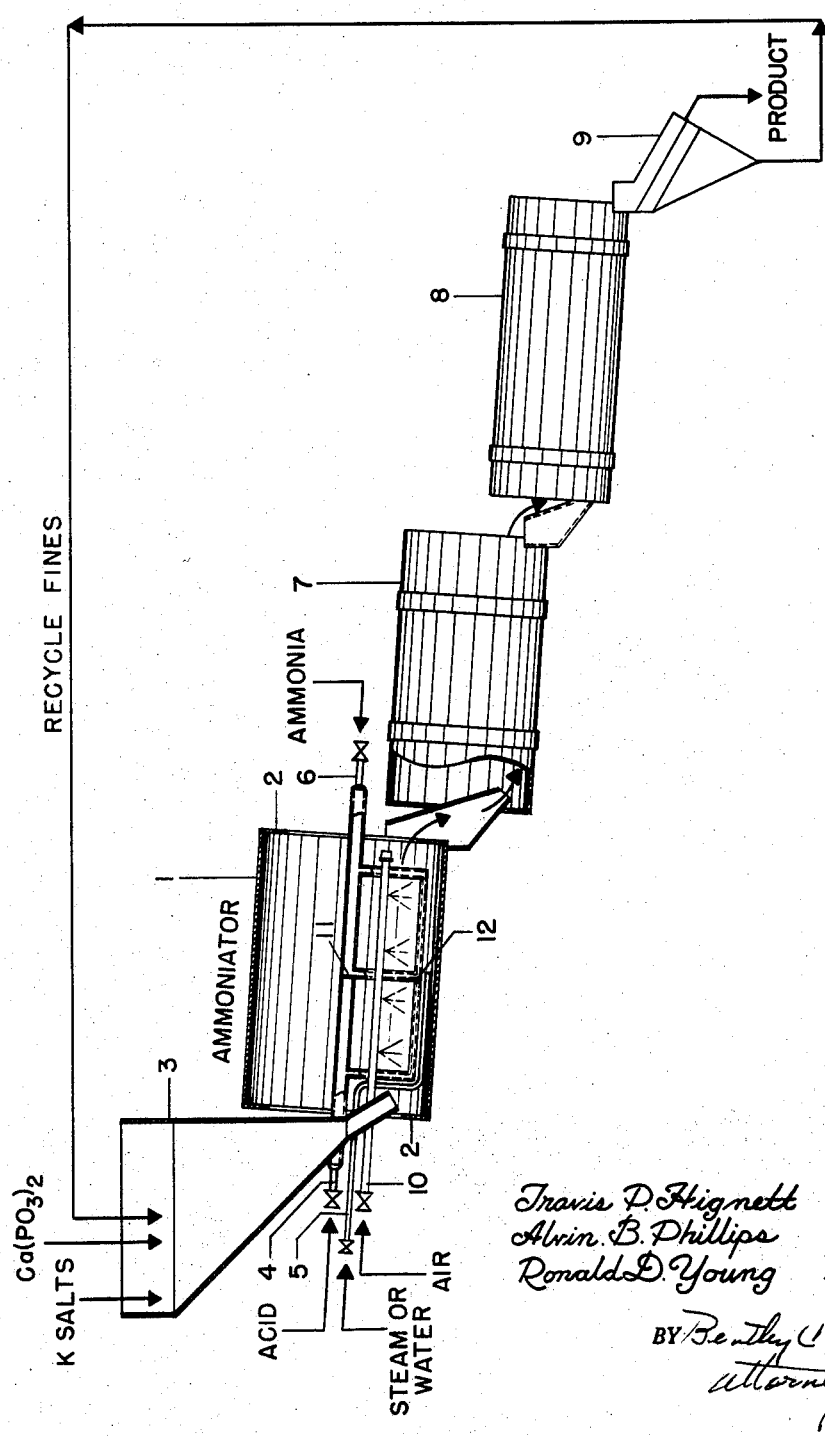
Travis P. Hignett
Alvin B. Phillips
Ronald D. Young   INVENTOR.
BY Bentley C. Morrow
Attorney

2,945,754

GRANULAR FERTILIZER FROM CALCIUM METAPHOSPHATE

Travis P. Hignett, Sheffield, and Alvin B. Phillips and Ronald D. Young, Florence, Ala., assignors to Tennessee Valley Authority, a corporation of the United States Filed Apr. 19, 1956, Ser. No. 579,413

2 Claims. (Cl. 71—37)

(Granted under Title 35, U.S. Code (1952), sec. 266)

The invention herein described may be manufactured and used by or for the Government for governmental purposes without the payment to us of any royalty therefor.

This invention relates to an improved method for producing granular fertilizer from calcium metaphosphate. Calcium metaphosphate of fertilizer grade has been prepared by absorbing phosphorus pentoxide in phosphate rock, as is shown in U.S. Patents 1,925,644; 1,925,645; and 2,589,272. The materials prepared by the processes of these patents are hard, glassy substances usually containing about 65 percent $P_2O_5$. Iron and aluminum metaphosphates and silico-phosphates are present in addition to calcium metaphosphate. The mole ratio $CaO:P_2O_5$ may vary from about 0.9 to 1.1, or over a somewhat wider range.

Since these crude calcium metaphosphates have a very high $P_2O_5$ content they have the advantage of furnishing any required quantity of phosphate in low total weight of fertilizer. This leads to secondary advantages of low transportation costs and low gross weight of material to be applied to the soil. Calcium metaphosphate fertilizer has been tested by agricultural experiment stations and colleges in many of the states and territories of the United States, with a great variety of crops, and in many types of soils. Total crop response per unit of $P_2O_5$ applied has been found to be substantially the same when phosphate is applied as metaphosphate as it is when phosphate is applied as superphosphate, except on certain calcareous or alkaline soils where the crop response to metaphosphate may be inferior. Calcium metaphosphate may be inferior, also, for uses such as starter fertilizer when quick availability is needed.

Although total crop response is substantially the same for metaphosphate and superphosphate, there is a great difference in the behavior of these materials in the soil. When an orthophosphate such as superphosphate is applied, the quantity of available phosphate is at it maximum immediately after application. Available phosphate decreases rapidly. Usually not more than one-tenth of the orthophosphate applied can be accounted for by determining the quantity of phosphate taken up by plants grown on the soil and the quantity leached out of the soil. The remainder is bound in the soil in some unknown form, unavailable for plant food.

When metaphosphate is applied as fertilizer a quite different group of chemical reactions occur. Phosphate in water-soluble forms available for plant food is at its minimum immediately after the application. The quantity of water-soluble material slowly increases over a long period of time. Thus, when metaphosphate is used as fertilizer, much of its phosphate content becomes water soluble later in the growing season.

The reason for this effect is believed to lie in the structure of calcium metaphosphate and its hydration and hydrolysis in the soil. Little is known concerning the structure of the crude, glassy calcium metaphosphates. It is known that the metaphosphates have a strong tendency to polymerize. For instance, commercial metaphosphates sold as "hexametaphosphates" sometimes have been found by molecular weight determinations to contain as many as 20 metaphosphate units combined in a single molecule. No accurate methods for separating high polymers of metaphosphate are known, and as a result little is known about conditions causing polymerization and dissociation of polymers.

It is known that the crude calcium metaphosphates can be hydrolyzed. The end product is the highly water-soluble monocalcium orthophosphate monohydrate. The mechanism of hydrolysis is unknown, but it is known to be quite complex. For instance, when finely ground calcium metaphosphate is exposed to the atmosphere it absorbs water and becomes gummy and sticky. A monohydrate is formed on the surface of the particles. Treatment of crushed glassy calcium metaphosphate with steam greatly increases its solubility in water, although little orthophosphate is formed. There is some evidence that the hydrolysis proceeds through formation of dimerized pyrophosphates, but this has not been established with certainty.

Since the mechanism and intermediate products of hydrolysis are not known, the term "incompletely hydrolyzed metaphosphate" is used in this specification and claims to include any and all hydrates and intermediate products of hydrolysis of this material formed in carrying out the process described below.

It is an object of this invention to provide granular, nonhygroscopic, freeflowing fertilizer materials containing phosphate in such varieties of forms and proportions that a substantial proportion of such phosphate is in water-soluble form and therefore available for plant use immediately after the fertilizer is applied to soil, and an increased amount of soluble phosphate is maintained in the soil for a long period of time.

Another object is to provide such process wherein materials operated on remain in particulate condition during the operation and do not go through a pasty state.

Another object is to provide such process that can be carried out in equipment commonly available in fertilizer plants.

Still another object is to provide such process which is simple, easy and cheap to carry on, and in which difficulties due to setting of materials in equipment used are eliminated.

Other objects and advantages will become apparent as this disclosure proceeds.

We have found that the above objects are attained in a granular, high-analysis fertilizer material having about 15 to 60 percent of its phosphate content in water-soluble form and not more than 50 percent of said phosphate content in the form of orthophosphate, and comprising calcium metaphosphate, incompletely hydrolyzed metaphosphate, and calcium orthophosphate. We have found further that such materials may be produced by a process which comprises introducing calcium metaphosphate or a mixture of materials containing calcium metaphosphate into the upper end of an inclined rotating drum; maintaining a bed of rolling solid particles of such materials within the drum; introducing an acid selected from the group consisting of sulfuric acid, phosphoric acid, and nitric acid beneath the surface of the bed at controlled rate; maintaining the temperature of the bed in the range 150° to 240° F., or preferably 160° to 215° F.; introducing water or steam into the bed in such proportions that the water contained in the acid, and introduced as liquid or as steam, less the water evaporated in the process, is insufficient to completely hydrolyze the calcium metaphosphate introduced under these conditions; and cooling the resulting granules. The principal factors affecting the extent of metaphosphate hydrolysis are the quantity of acid introduced, the quantity of water present, the temperature, and the retention time under hydrolyzing conditions. With many formulations the quantity of acid is determined by the quantity of ammonia to be fixed in the product as an ammonium salt. The permissible temperature range is limited to that in which granulation will occur with the particular formulation.

When a part of, or all the water is introduced as steam, some of it passes through the bed of particles and is lost from the process. Only that portion retained is effective for partial hydrolysis of metaphosphate.

The attached drawing illustrates diagrammatically one method of carrying out the process of our invention. With reference thereto, the numeral 1 indicates an inclined rotary drum having annular retaining rings 2 at each end. Calcium metaphosphate is introduced into this drum via hopper 3. Potassium salts, ammonium sulfate, superphosphate phosphate rock, or other dry fertilizer materials, if required by the particular formulation being produced, may be added with the calcium metaphosphate or separately at the upper end of drum 1 through hopper 3. The solid material or materials form a rolling bed of particles within the drum. The depth of this bed is predetermined by the width of retaining rings 2.

An acid selected from the group consisting of sulfuric acid, phosphoric acid, and nitric acid is introduced beneath the surface of the bed via a perforated line or distributor 4. Distributor 4 is disposed parallel to the axis of drum 1 near the inner surface of the drum and about 20° to 40° from a vertical diameter of the drum in its direction of rotation, as is described in U.S. Patent 2,741,545. In fact, we prefer to use the apparatus of that patent, with a few minor modifications, in carrying out our process. We prefer to introduce highly concentrated acid to decrease corrosion, although more dilute acid can be used when the apparatus is constructed of suitable corrosion-resistant materials. For instance, if sulfuric acid be used we prefer to use it at a strength of 94 percent, which can be handled in ordinary steel without undue corrosion.

The functions of this acid are to promote hydrolysis of the calcium metaphosphate, to serve as a means for fixing ammonia in the fertilizer, and to heat the bed of rolling particles by its sensible heats of dilution and of reaction when neutralized with ammonia. Other reactions occurring in the bed supply additional heat. The quantity of acid introduced usually will depend on the amount of ammonia it is desired to fix in this manner, or, in a no-nitrogen grade, the amount of acid required to acidulate the phosphate rock included in the formulation. Acid is not consumed in the hydrolysis of metaphosphate but merely promotes it.

The length of distributor line 4 is about one-half that of drum 1. Thus the acid is introduced in the upper half of the inclined drum and the solid materials are acidulated immediately upon introduction into it.

An ammoniating fluid such as one of the common ammonium nitrate-ammonia-water solutions widely used for ammoniating fertilizer mixtures, or anhydrous ammonia, is introduced via distributor line 6 in quantity sufficient to neutralize the acid present. Distributor line 6 may be made integral with distributor line 4, as shown, lines 4 and 6 being separated by suitable partitions 11 and 12, or line 6 may be a separate perforated line arranged longitudinally in the lower half of drum 1 beneath the bed.

Liquid water or steam is introduced through perforated line 5, parallel to and spaced from lines 4 and 6. The material in the rolling bed is maintained in the temperature range 150° to 240° F., or preferably in the range 160° to 215° F. Usually, the heats of reaction and dilution are more than enough to supply all heat required. In that case, water may be introduced via line 5 in liquid state to obtain a cooling effect. If this is insufficient to cool the materials enough, a blast of cooling air from line 10 is directed upon the surface of the rolling bed. This air penetrates into the bed somewhat and, in addition to its cooling effect, increases evaporation from the surface of the forming granules. Control of liquid phase on the surface of forming granules may be achieved by varying the amount of cooling air; the quantity of liquid phase on the surface in turn controls the degree of granulation obtained in the drum.

When the formulation is such that the heat of reaction is insufficient to raise temperatures in the bed to the desired range, water in the form of steam is introduced through line 5 to supply the additional heat required.

In any case the total water introduced, including moisture present in the solid feed, water content of the acid feed, and water introduced via line 5 as liquid water or steam is controlled so that the amount of water retained in the product is not more than about two-thirds the quantity required to hydrolyze the metaphosphate completely. The total quantity of water used ordinarily is about 25 to 100 pounds per ton of product. Usually not more than about one-eighth to one-half the water required for complete hydrolysis of the metaphosphate contained in the feed is added. In some cases, however, amount of water vaporized, degree of acidity, and other conditions affecting metaphosphate hydrolysis may be more important than the water input in controlling the extent of hydrolysis.

The following table shows the quantity and ratios of water actually used in producing several grades of fertilizer containing incompletely hydrolyzed metaphosphate.

| Grade | Pounds H$_2$O/ ton product | Moles H$_2$O/ mole Ca(PO$_3$)$_2$ | Percent of H$_2$O required for hydrolysis to monocalcium orthophosphate monohydrate |
| --- | --- | --- | --- |
| 13-13-13 | 40-50 | 1 to 1.3 | 33 to 43 |
| 9-18-18 | 30 | .55 | 18 |
| 8-40-0 | 20 | .2 | 7 |
| 6-24-24 | 95 | 2.0 | 67 |
| 11-22-11 | 20 | .15 | 5 |
| 0-24-24 | 320 | 7.0 | 230 |
| 5-20-20 | 30 | .70 | 23 |

Water added in ammoniating fluid has little effect in hydrolyzing calcium metaphosphate, since it is added under neutralizing conditions.

The rate of flow of materials is regulated so that solids fed pass through drum 1 in about 3 to 8 minutes. This rate provides for a retention time in the initial half of the drum under acidulating conditions of about 1½ to 4 minutes and approximately the same retention in the final half of the drum under neutralizing conditions.

When the process is carried out in the manner described above, most high-analysis formulations result in substantially complete granulation in drum 1. The materials operated on do not pass through a pasty stage but develop only sufficient plasticity to promote formation of granules of the desired size. With some formulations, however, granulation is not quite complete when the material emerges from the final half of drum 1. In that case the material is passed to a granulator 7, which is merely a revolving drum, and is rolled therein for a few minutes to complete granulation.

When granulation is substantially complete, either in drum 1 or in granulator 7, the granulated material is passed through a suitable cooler 8. The granules are then sized, oversize material is crushed, and fines are recycled to the feed end of drum 1. The amount of fines recycled has been in the range from about 7 to 50 percent of the material processed.

The sized product is composed of hard, strong, non-hygroscopic, free-flowing granules. These granules contain calcium metaphosphate, incompletely hydrolyzed metaphosphate, calcium orthophosphate, with ammonium salts, and potash salts, if the last two are used in the formulation. These substances are present in substantially uniform mixture. Usually only 0.5 percent to 0.8 percent free moisture is present. Upon storage, further drying occurs and there is an increase in the proportion of water-soluble phosphate to an extent that cannot be accounted for by assuming that the residual moisture is utilized in hydrolysis of metaphosphate. Apparently there is some rearrangement of bound water in hydration products included in the incompletely hydrolyzed metaphosphate. Usually not more than 50 percent of the phosphate content of these granules is present in the form of orthophosphate, and about 15 to 60 percent of total phosphate is in water-soluble form. The following table shows typical increases in water solubility of $P_2O_5$ on storage in several grades of fertilizer made as described above.

| Grade | Original analysis | | Later analysis | |
|---|---|---|---|---|
| | Storage time | Water-soluble $P_2O_5$ percent | Storage time | Water-soluble $P_2O_5$, percent |
| 13-13-13 | 1 day | 27-33 | 9-12 wks | 38-43 |
| | 1 day | 35 | 6 wks | 60 |
| | 1 day | 19 | 2 wks | 34 |
| 8-40-0 | 4 days | 20 | 8 wks | 22 |
| 6-24-24 | 1 day | 18 | 2 wks | 25 |
| 11-22-11 | 1 day | 10 | 2 wks | 23 |
| 9-18-18 | 1 day | 20 | 2 wks | 25 |

Thus these products are capable of furnishing a substantial part of their phosphate content in a form usable for plant food immediately after application to soil. As this immediately usable phosphate becomes fixed by the soil in unavailable form it is replaced by water-soluble phosphate from incompletely hydrolyzed metaphosphate, and continuing hydrolysis of metaphosphate maintains a high level of water-soluble phosphate in the soil over a long period of time.

The process described above is applicable to the preparation of high-analysis fertilizers, i.e., to fertilizers having a total $N+P_2O_5+K_2O$ content of 35 percent or more. Typical high-analysis grades that we have successfully prepared in this manner are 13-13-13; 10-20-10; 9-18-18; 6-24-24; 11-22-11; 5-20-20; 7-28-14; 8-16-16; 0-24-24; 8-40-0; and 9-36-0. Our process is applicable to many other formulations in this general range.

*Example*

Fertilizers of the above types were prepared by the process described. The apparatus used corresponded to that illustrated in the attached drawing. Drum 1 was 3 feet in diameter and 3 feet long. Distributor lines 4 and 6 for acid and ammoniating fluid, respectively, were made integral, partitions separating their interiors at about the midpoints, as illustrated at 11 and 12. Distributor line 5 for steam or water was an ordinary pipe extending longitudinally in the bottom of the drum and having perforations at frequent intervals along one side. The following tables give the details of operation for a number of runs producing several different grades of granular fertilizer containing calcium metaphosphate, incompletely hydrolyzed metaphosphate, and calcium orthophosphate and other fertilizer salts.

| | |
|---|---|
| Grade of product | 13-13-13 |
| Production rate, tons/hour | 0.95 |
| Formulation, pound/ton product: | |
| Calcium metaphosphate (−100 mesh) | 410 |
| Sulfuric acid (94% $H_2SO_4$) | 295 |
| Nitrogen solution (21.7% $NH_3$, 65% $NH_4NO_3$, 13% $H_2O$) | 365 |
| Ammonium sulfate | 585 |
| Potassium chloride | 380 |
| $H_2O$ | 380 |
| Recycle | 855 |
| Nominal retention time, minutes | 8 |
| Depth of bed above ammonia inlets, inches | 7 |
| Ammoniator cooling air, cubic feet/ton product | 10,800 |
| Loss of free ammonia, percent (by gas analysis) | 3.0 |
| Temperature, °F.: | |
| Ammoniated material | 212 |
| Granulated material | 200 |
| Screen analysis (Tyler), percent, granulator product: | |
| Oversize (+6 mesh) | 35.1 |
| Onsize (−6+28 mesh) | 61.8 |
| Undersize (−28 mesh) | 3.1 |
| Chemical composition of product, percent: | |
| Total N | 12.8 |
| Ammoniacal N | 10.8 |
| Total $P_2O_5$ | 13.5 |
| Citrate-soluble $P_2O_5$ | 13.1 |
| Water-soluble $P_2O_5$ | 5.0 |
| $K_2O$ | 13.1 |
| $H_2O$ | 0.6 |

| | 0-24-24 | 9-18-18 |
|---|---|---|
| Grade | | |
| Production rate, tons/hour | 1.1 | 1.0 |
| Formulation, pound/ton product: | | |
| Calcium metaphosphate (−16 mesh) | 507 | 604 |
| Sulfuric acid (94% $H_2SO_4$) | 318 | 297 |
| Phosphate rock | 433 | |
| Nitrogen solution (16.6% $NH_3$, 66.8% $NH_4NO_3$, 16.6% $H_2O$) | | 575 |
| Potassium chloride | 756 | 616 |
| $H_2O$ | 268 | 9 |
| Recycle | | 2602 |
| Ammoniator cooling air, cubic feet/ton product | 0 | 0 |
| Loss of free ammonia, percent (by gas analysis) | | Nil |
| Temperature, °F. | | |
| Ammoniator product | 160 | 180 |
| Granulator product | 141 | 170 |
| Screen analysis (Tyler), percent: | | |
| Cooler or dryer product | (Dryer) | (Cooler) |
| Oversize (+6 mesh) | 13.5 | 31.9 |
| Onsize (−6+28 mesh) | 86.0 | 67.6 |
| Undersize (−28 mesh) | 0.5 | 0.5 |
| Chemical analysis of product, percent: | | |
| Total N | | 9.2 |
| Ammoniacal N | | 6.3 |
| Total $P_2O_5$ | 25.3 | 20.5 |
| Citrate-soluble $P_2O_5$ | 22.8 | 19.7 |
| Water-soluble $P_2O_5$ | 8.6 | 5.3 |
| $K_2O$ | 22.8 | 18.7 |
| $H_2O$ | 0.2 | 0.8 |

In the preparation of 0-24-24 fertilizer a relatively large quantity of water was used. About one-third of this was added as steam. The product emerging from the granulator 7 had a rather high moisture content and was passed to a dryer where it dried to 0.2 percent moisture before cooling. Under these conditions the desired extent of incomplete hydrolysis of metaphosphate was obtained.

| | |
|---|---|
| Grade | 5-20-20 |
| Production rate, tons/hour | 3.0 |
| Formulation, pound/ton product: | |
| Calcium metaphosphate (−16 mesh) | 510 |
| Ordinary superphosphate | 460 |
| Sulfuric acid (94% $H_2SO_4$) | 127 |
| Nitrogen solution (16.6% $NH_3$, 66.8% $NH_4NO_3$, 16.6% $H_2O$) | 297 |
| Potassium chloride | 662 |
| $H_2O$ | 20 |
| Recycle | 153 |
| Nominal retention time, minutes | 2.7 |
| Depth of bed above $NH_3$ inlets, inches | 7 |
| Ammoniator cooling air, cubic feet/ton product | 0 |
| Free ammonia loss, percent (by gas analysis) | 0.5 |
| Temperature, °F.: | |
| Ammoniator product | 200 |
| Granulator product | 184 |
| Screen analysis (Tyler), percent, cooler product: | |
| Oversize (+6 mesh) | 12.3 |
| Onsize (−6+28 mesh) | 84.0 |
| Undersize (−28 mesh) | 3.7 |

Chemical analysis of product, percent:
- Total N — 5.0
- Ammoniacal N — 3.4
- Total $P_2O_5$ — 22.4
- Citrate-soluble $P_2O_5$ — 21.9
- Water-soluble $P_2O_5$ — 5.3
- $K_2O$ — 20.1
- $H_2O$ — 1.2

Grade — 9–36–0
Production rate, ton/hour — 0.90

Formulation, pound/ton product:
- Calcium metaphosphate (−16 mesh) — 1201
- Sulfuric acid (94% $H_2SO_4$) — 330
- Nitrogen solution (21.7% $NH_3$, 65% $NH_4NO_3$, 13.3% $H_2O$) — 511
- $H_2O$ — 0
- Recycle — 2272

Ammoniator cooling air, cubic feet/ton product — 9800
Loss of free ammonia, percent (by gas analysis) — —

Temperature, °F.:
- Ammoniator product — 217
- Granulator product — 194

Screen analysis (Tyler), percent, granulator product:
- Oversize (+6 mesh) — 7.1
- Onsize (−6+28 mesh) — 91.0
- Undersize (−28 mesh) — 1.9

Chemical analysis of product, percent:
- Total N — 9.9
- Ammoniacal N — 6.1
- Total $P_2O_5$ — 38.2
- Citrate-soluble $P_2O_5$ — 36.7
- Water-soluble $P_2O_5$ — 6.4
- $H_2O$ — 0.4

We claim as our invention:

1. A process for the production of a granular, nonhygroscopic, free-flowing fertilizer containing an ammonium salt, calcium metaphosphate, incompletely hydrolyzed metaphosphate, and calcium orthophosphate which comprises introducing a solid fertilizer material comprising calcium metaphosphate into a rotating drum; maintaining a rolling bed of solid material within the drum; introducing a concentrated acid selected from the group consisting of sulfuric acid, phosphoric acid, and nitric acid and mixtures thereof beneath the surface of the rolling bed in the initial half of the drum; introducing an ammoniating fluid beneath the surface of the rolling bed in the final half of the drum in quantity substantially sufficient to neutralize the acid introduced; maintaining the temperature of the material within the drum in the range from about 160° to 215° F.; introducing water beneath the surface of the rolling bed; controlling the quantity of water introduced so that the total water introduced less that evaporated is not more than about two-thirds that required for complete hydrolysis of calcium metaphosphate fed; passing the bed of material through the drum at a rate of flow to provide a retention time in the drum of about 3 to 8 minutes; and withdrawing at least partially granulated fertilizer from the drum.

2. A process for the production of a granular, non-hygroscopic, free-flowing fertilizer containing ammonium and potash salts, calcium metaphosphate, incompletely hydrolyzed metaphosphate, and calcium orthophosphate which comprises introducing a solid fertilizer material comprising a potash salt and calcium metaphosphate into a rotating drum; maintaining a rolling bed of solid material within the drum; introducing a concentrated acid selected from the group consisting of sulfuric acid, phosphoric acid, and nitric acid and mixtures thereof beneath the surface of the rolling bed in the initial half of the drum; introducing an ammoniating fluid beneath the surface of the rolling bed in the final half of the drum in quantity substantially sufficient to neutralize the acid introduced; maintaining the temperature of the material within the drum in the range from about 160° to 215° F.; introducing water beneath the surface of the rolling bed; controlling the quantity of water introduced so that total water introduced less that evaporated is about one-eighth to one-half that required for complete hydrolysis of calcium metaphosphate fed; passing the bed of material through the drum at a rate of flow to provide a retention time in the drum of about 3 to 8 minutes; controlling the degree of granulation in the drum by a controlled blast of air directed upon the surface of the bed; and withdrawing at least partially granulated fertilizer from the drum.

References Cited in the file of this patent

UNITED STATES PATENTS

| Number | Name | Date |
|---|---|---|
| 2,064,979 | Kaselitz | Dec. 22, 1936 |
| 2,165,948 | Taylor | July 11, 1939 |
| 2,287,759 | Hardesty et al. | June 23, 1942 |
| 2,680,680 | Coleman | June 5, 1954 |
| 2,739,886 | Facer | Mar. 27, 1956 |
| 2,837,418 | Seymour | June 3, 1958 |

UNITED STATES PATENT OFFICE
CERTIFICATE OF CORRECTION

Patent No. 2,945,754                                    July 19, 1960

Travis P. Hignett et al.

It is hereby certified that error appears in the printed specification of the above numbered patent requiring correction and that the said Letters Patent should read as corrected below.

Column 3, line 18, after "superphosphate" insert a comma; column 5, line 69, for "13%" read -- 13.3% --; line 72, for "380" read -- 20 --.

Signed and sealed this 31st day of January 1961.

(SEAL)
Attest:
KARL H. AXLINE

Attesting Officer

ROBERT C. WATSON
Commissioner of Patents